Figure 1:
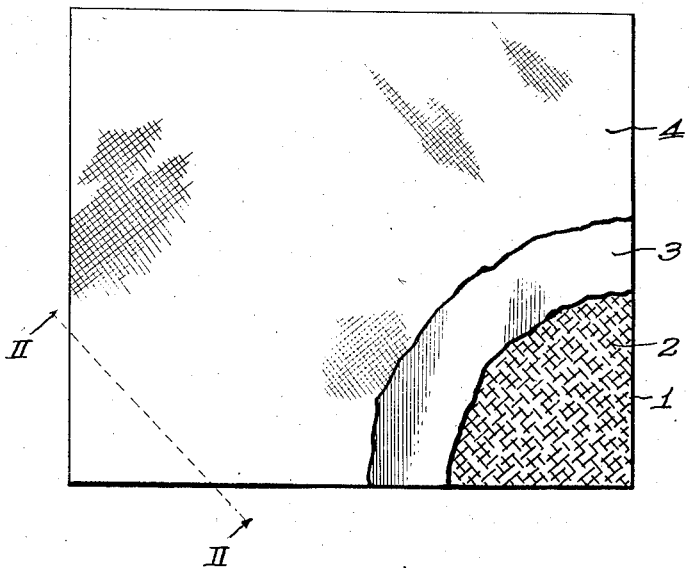

June 9, 1925.  W. DRABOLD  1,540,982

REPAIR PATCH

Filed May 11, 1921

Inventor
Walter Drabold
By
Attorneys

Patented June 9, 1925.

1,540,982

UNITED STATES PATENT OFFICE.

WALTER DRABOLD, OF DETROIT, MICHIGAN.

REPAIR PATCH.

Application filed May 11, 1921. Serial No. 468,476.

*To all whom it may concern:*

Be it known that I, WALTER DRABOLD, a citizen of the United States of America, residing at Detroit, in the county of Wayne and State of Michigan, who have invented certain new and useful Improvements in Repair Patches, of which the following is a specification, reference being had therein to the accompanying drawings.

This invention relates to a repair patch for inner tubes and tires, and my invention aims to provide an elastic or stretchable patch for closing a puncture, blow-out or aperture of a tube or tire, also for reinforcing or strengthening weak or worn portions of a tube or tire. The patch has been made elastic so that it may stretch and at all times conform to the shape of a tube or tire, and this is in contradistinction to that class of patches which are not elastic and consequently cannot give or conform to any changes in the tube and tire, resulting in the patch becoming loose and ineffective for the purposes for which it is intended.

My invention further aims to provide a repair patch for tubes and tires that is protected when not in use, easy to apply to the injured portion of the tube or tire, and highly efficient for the purposes for which it is intended.

The construction entering into my repair patch will be hereinafter described and then claimed, and reference will now be had to the drawing, wherein—

Figure 2:
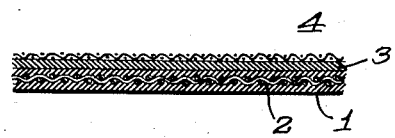

Figure 1 is a plan of a patch, partly broken away, showing layers of material entering into the patch, and Fig. 2 is a cross sectional view taken on the line II—II of Fig. 1.

The patch is cut from a sheet composed of rubber, fabric and gum. The body of the sheet or patch is a unitary structure composed of rubber 1 with an elastic fabric 2 embedded therein, the rubber and fabric being heat pressed together and of sufficient thickness to entirely prevent the passage of air therethrough at all pressures to which a tube may be subjected. The elastic fabric 2 is interwoven and of such a nature that it may be stretched, as will hereinafter appear.

On one face of the rubber body is placed uncured gum of an air excluding quality and this uncured gum is designated 3. It permanently adheres to the rubber body and provides means of attaching the patch to a tube or tire. The uncured gum is protected by a piece of fabric 4 which removably adheres to the uncured gum to fix the gum while the patch is not in use, but when the protecting fabric 4 is removed or stripped from the patch, the patch is in condition to be applied to the injured surface of a tube or tire.

To apply the patch to the injured surface of the tube, it is preferable to scrape and clean the injured surface of the tube and then apply a suitable solvent which will prepare the surface of the tube for the patch, and in some instances, a suitable cement may be employed for connecting the patch to the tube.

As pointed out in the beginning, the elastic fabric 2 is preferably interwoven and in cutting the patch from the sheet of material, it is cut so that the weave of the fabric 2 will be at a bias to the edges of the patch. This is best shown in Fig. 1 where a corner of the patch has been broken away to show that the threads or strands of the elastic fabric intersect one another and are at angles relative to the edges of the fabric. This disposal of the fabric is in contradistinction to a fabric which has its strands or threads extending longitudinally and crosswise of the patch, for with such a piece of fabric, it is practically impossible to stretch the same, as the stretching action or stress is always in the direction of the threads or strands. With my patch any longitudinal or transverse stretching of the patch causes the interstices of the fabric threads or strands to elongate in the direction of the stress, and this is very important as it permits a patch to accommodate itself to the shape of a tube without becoming displaced or exposing weakened portions of a tube. In other words, if the patch could not stretch, weakened portions of a tube may be pulled out from under the patch, whereas if the patch may stretch it will at all times cover the weakened portions of a tube and thus be more efficient, for repair purposes than a non-elastic patch. It is now apparent that the diagonal arrangement of the threads, or strands of the elastic fabric is essential in order that my repair patch may stretch, and while the material herein cited as constituting the patch may be considered essential, yet I do not care to confine my invention other than defined by the appended claim.

What I claim is:—

A repair patch adapted to conform to and partake of the stretching characteristics of an inner tube when applied to a deflated tube, said patch comprises a piece of fabric having threads angularly disposed relative to one another and also to the edges of the fabric so that the fabric may be stretched in any direction at its edges other than in the direction of the fabric threads, said piece of fabric being embedded in rubber and heat pressed together to form a unitary stretchable structure of sufficient thickness to entirely prevent the passage of air at all pressures to which the tube is subjected, a covering of uncured gum of air excluding quality permanently adhering to the exposed surface of said unitary structure, the area of the fabric and of the rubber being co-extensive, and a protecting fabric covering removably adhering to the surface of said gum covering.

In testimony whereof I affix my signature in presence of two witnesses.

WALTER DRABOLD.

Witnesses:
ANNA M. DORR,
KARL H. BUTLER.